United States Patent
Kullen et al.

(10) Patent No.: US 11,413,927 B2
(45) Date of Patent: Aug. 16, 2022

(54) MOTOR VEHICLE AIR CONDITIONING UNIT

(71) Applicant: MAHLE International GmbH, Stuttgart (DE)

(72) Inventors: Philipp Kullen, Munich (DE); Holger Laux, Dietingen (DE); Erich Litwing, Spraitbach (DE); Oliver Schultze, Stuttgart (DE); Vincenzo Venezia, Magstadt (DE)

(73) Assignee: MAHLE International GmbH, Stuttgart (DE)

( * ) Notice: Subject to any disclaimer, the term of this patent is extended or adjusted under 35 U.S.C. 154(b) by 259 days.

(21) Appl. No.: 16/857,981

(22) Filed: Apr. 24, 2020

(65) Prior Publication Data
US 2020/0338949 A1 Oct. 29, 2020

(30) Foreign Application Priority Data
Apr. 25, 2019 (DE) ...................... 10 2019 205 929.5

(51) Int. Cl.
*B60H 1/00* (2006.01)

(52) U.S. Cl.
CPC ..... *B60H 1/00028* (2013.01); *B60H 1/00007* (2013.01); *B60H 1/00042* (2013.01); *B60H 1/0065* (2013.01); *B60H 1/00321* (2013.01); *B60H 1/00678* (2013.01); *B60H 2001/00185* (2013.01); *B60H 2001/00721* (2013.01)

(58) Field of Classification Search
CPC ............ B60H 1/00028; B60H 1/00007; B60H 1/00042; B60H 1/00321; B60H 1/0065; B60H 1/00664; B60H 1/00671; B60H 1/00678; B60H 2001/00185; B60H 2001/00721
See application file for complete search history.

(56) References Cited

U.S. PATENT DOCUMENTS

| | | | | |
|---|---|---|---|---|
| 5,106,018 A | * | 4/1992 | Loup | B60H 1/00678 454/126 |
| 5,647,399 A | * | 7/1997 | Andersen | F16K 11/22 251/304 |
| 6,463,998 B1 | | 10/2002 | Shindo | |

(Continued)

FOREIGN PATENT DOCUMENTS

EP 2 390 123 B1 8/2015

*Primary Examiner* — Marc E Norman
(74) *Attorney, Agent, or Firm* — Muncy, Geissler, Olds & Lowe, P.C.

(57) ABSTRACT

A motor vehicle air conditioning unit, having a housing with at least one air channel arranged therein and with at least one heat exchanger for conditioning the air in the at least one air channel, the housing having at least one first air outlet and one second air outlet, a first air outlet channel being assigned to the first air outlet and conducting air to the first air outlet, and a second air outlet channel being assigned to the second air outlet and conducting air to the second air outlet, a first vane valve and a second vane valve being provided. The first vane valve assigned to the first air outlet channel, and the second vane valve assigned to the second air outlet channel, the first vane valve and the second vane valve being rotatably fixedly connected to a shaft and being rotatable by an actuator driving the shaft.

12 Claims, 4 Drawing Sheets

(56) References Cited

U.S. PATENT DOCUMENTS

| | | | |
|---|---|---|---|
| 6,484,755 B1* | 11/2002 | Schwarz ............ | B60H 1/00678 165/203 |
| 2005/0118944 A1* | 6/2005 | Vincent ............. | B60H 1/00064 454/121 |

* cited by examiner

MOTOR VEHICLE AIR CONDITIONING UNIT

This nonprovisional application claims priority under 35 U.S.C. § 119(a) to German Patent Application No. 10 2019 205 929.5, which was filed in Germany on Apr. 25, 2019, and which is herein incorporated by reference.

BACKGROUND OF THE INVENTION

Field of the Invention

The present invention relates to a motor vehicle air conditioning unit according to the definition of the species in claim 1.

Description of the Background Art

Air conditioners for motor vehicles typically include a housing with at least one air channel arranged therein and with at least one heat exchanger arranged therein. A blower is also typically provided to blow or suck air into the housing and to generate an air flow in the at least one air channel. The air is thermally conditioned in the housing with the aid of the at least one heat exchanger and discharged via air outlets and/or distributed on output-side outlet channels to air outlets in the motor vehicle. A distinction is made between air outlets in the front area, i.e. in the area of the driver and passenger, and in the rear area, i.e. in the area of the passengers in the second seat row or in a rear seat row. A distinction is also made between outlets in the area of the windshield, also referred to as a defroster, an upper body area, also referred to as a ventilation, and a foot area, in which air is discharged in the lower area of the passenger compartment.

A plurality of outlet channels or air outlets are typically provided, which are to be controlled with regard to their inflow or through-flow. This results in a plurality of control variants, which may be managed only with difficulty, so that a large number of actuators results in considerable costs in order to be controlled.

If two air channels or air outlet channels are considered, a shared control using only one actuator is associated with a cost reduction, compared to independent control, the individual controllability being reduced. EP 2 390 123 B1 discloses a valve arrangement of two valves for two air channels, in which a vane valve and a drum valve are each assigned to one air channel and are operated on an axle and are driven and rotated by an actuator. However, the controllability of the air channels is provided for the defroster channel and for the ventilation channel, referred to as the diffuse air flow. A control of different outlet channels elsewhere by two interconnected valves is viewed as disadvantageous, due to the rigid coupling.

SUMMARY OF THE INVENTION

It is therefore an object of the present invention to provide a motor vehicle air conditioning unit, in which an easy and cost-effective control of air outlet channels may be carried out.

An exemplary embodiment of the invention relates to a motor vehicle air conditioning unit, which comprises a housing with at least one air channel arranged therein and with at least one heat exchanger arranged therein for conditioning the air in the at least one air channel, the housing having at least one first air outlet and one second air outlet, a first air outlet channel being assigned to the first air outlet and conducting air to the first air outlet, and a second air outlet channel being assigned to the second air outlet and conducting air to the second air outlet, a first vane valve and a second vane valve being provided, the first vane valve being assigned to the first air outlet channel, and the second vane valve being assigned to the second air outlet channel, the first vane valve and the second vane valve being rotatably fixedly connected to a shaft and being rotatable by an actuator driving the shaft. As a result, an easy control with the aid of only one actuator may take place, in particular in air valves arranged adjacent to each other.

The first air outlet can be a rear footwell outlet, the first air outlet channel being a rear footwell air outlet channel, and if the second air outlet is a rear ventilation outlet, the second air outlet channel being a rear ventilation air outlet channel, or the first air outlet is a rear ventilation outlet, the first air outlet channel being a rear ventilation outlet channel, and the second air outlet is a rear footwell outlet, the second air outlet channel being a rear footwell air outlet channel. Other variants of air outlet may also be combined.

The first vane valve can be rotatable between a first end position and a second end position in the first air outlet channel, the first end position being a fully open position, and the second end position being a fully closed position. As a result, a complete flow through the first air outlet channel may be carried out by rotating the first vane valve between these two end positions until the air outlet channel is fully shut off.

The first air outlet channel can have a domed wall area between the first end position and the second end position of the first vane valve, which is selected in such a way that the first vane valve does not touch the wall area in a sealing manner with its vanes and/or with sealing elements provided on the vanes. In an intermediate position, this achieves the fact that the air channel is virtually closed, while a limited through-flow may still take place between the vane valve and the domed wall area.

The first air outlet channel can have a stop in the second end position, against which the vane(s) and/or the sealing elements provided on the vanes rest in a sealing manner in the second end position. The first air outlet channel may thus be completely closed.

The second vane valve can be rotatable between a first end position and a second end position in the second air outlet channel, the first end position being a fully closed position, and the second end position also being a fully closed position, the second vane valve being able to assume a completely open third position between the first end position and the second end position of the second vane valve. A complete through-flow as well as a complete closure may take place thereby. The closure is advantageously permitted in two end positions so that this closure may go hand in hand with the actuation of the first vane valve.

The second air outlet channel can have a stop in the first end position, against which the vane(s) and/or the sealing elements provided on the vanes rest in a sealing manner in the first end position, and the second air outlet channel has a stop in the second end position, against which the vane(s) and/or the sealing elements provided on the vanes rest in a sealing manner in the second end position, the second vane valve releasing the second air outlet channel in the fully open third position between the first end position and the second end position of the second vane valve.

The first air outlet channel and the second air outlet channel can be arranged in parallel to each other, at least in sections, and are arranged adjacent to each other. The air channels do hot necessarily have to run strictly straight and in parallel, but it is sufficient if they are arranged adjacent to each other, and if the extension of the particular air outlet channel has a common or similar orientation in the area of the vane valve.

The shaft can intersect the first air outlet channel and the second air outlet channel. As a result, the particular vane valve may be arranged on the shaft or be fastened thereto, or they may form a single part, the particular vane valves being arranged in the particular air outlet channels.

The first vane valve and/or the second vane valve can be a type of lug valve having one vane or a type of butterfly valve having two vanes opposite each other. An advantageous installation space may be utilized thereby, depending on the design of the vane valve.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
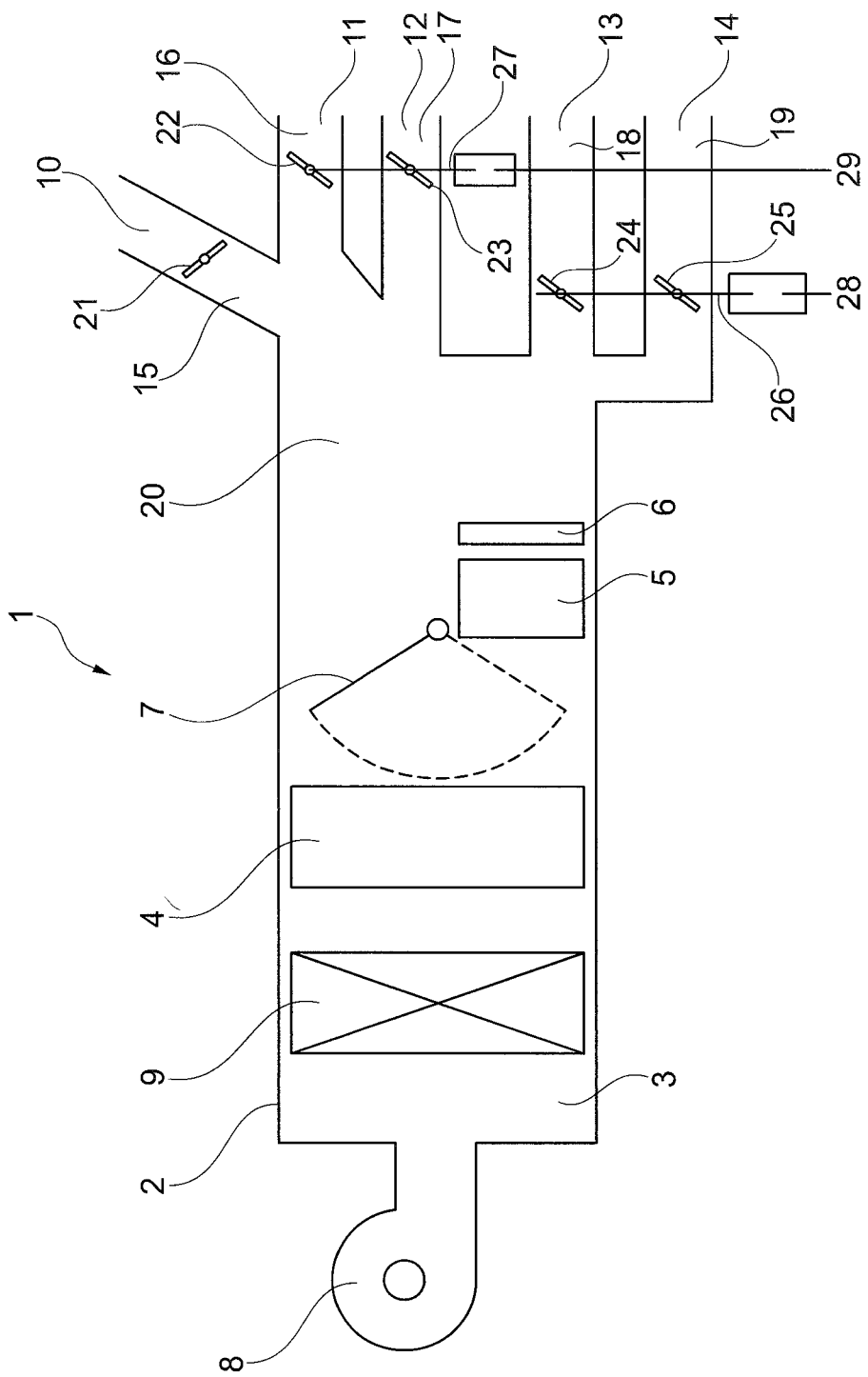
FIG. 1 shows a schematic representation of a motor vehicle air conditioning unit.

FIG. 1 shows a motor vehicle air conditioning unit 1 comprising a housing 2. At least one air channel 3 is provided in housing 2 and arranged therein, at least one heat exchanger 4, 5, 6 being provided in housing 2 and arranged therein for conditioning the air in the at least one air channel 3. In the illustrated exemplary embodiment, an evaporator 4 is provided for cooling the air. A heating element 5 and, for example, an optional additional heater 6 are situated downstream from evaporator 4 in the air flow. The mixing of the air cooled by the evaporator and the air heated by heating element 5 and additional heater 6 may be set with the aid of mixing valve 7.

A blower 8 for sucking in air or for generating an air flow in housing 2 is provided on the inlet side of housing 2, a filter 9 being provided downstream from the blower.

Housing 2 has at least one first air outlet 10, 11, 12, 13, 14 and one second air outlet 10, 11, 12, 13, 14. For example, five air outlets 11 through 14 of this type are illustrated, it being possible, according to the exemplary embodiment, to provide more or fewer air outlets of this type.

A corresponding air outlet channel 15, 16, 17, 18 and 19, which conducts air out of air channel 13 or mixing chamber 20 into particular air outlet 11 through 14, is assigned to particular air outlet 11 through 14. A first air outlet channel 15 through 19 is thus assigned to first air outlet 11 through 14, which conducts air to first air outlet 11 through 14. A second air outlet channel 15 through 19 is furthermore assigned to second air outlet 11 through 14, which conducts air to second air outlet 11 through 14.

In addition, at least one first vane valve 21, 22, 23, 24, 25 and one second vane valve 21, 22, 23, 24, 25 are provided. In the illustrated exemplary embodiment, five vane valves of this type are provided. More or fewer valve valves of this type may also be provided, but at least two. First vane valve 21, 22, 23, 24, 25 is assigned to first air outlet channel 15, 16, 17, 18, 19, and second valve 21, 22, 23, 24, 25 is assigned to second air outlet channel 15, 16, 17, 18, 19, first vane valve 21, 22, 23, 24, 25 and second vane valve 21, 22, 23, 24, 25 being rotatably fixedly connected to a shaft 26, 27 and rotatable by an actuator 28, 29 driving the shaft.

In the illustrated exemplary embodiment, vane valves 24, 25 are coupled with shaft 26 and are drivable by actuator 28, and vane valves 22, 23 are furthermore coupled with shaft 27 and are drivable by actuator 29. However, vane valves or two vane valves may also be coupled in a different configuration.

In the illustrated exemplary embodiment, first air outlet 14 may be a rear footwell outlet, first air outlet channel 19 being able to be a rear footwell air outlet channel, and second air outlet 13 may be a rear ventilation outlet, second air outlet channel 18 being able to be a rear ventilation air outlet channel. Alternatively, first air outlet 13 may be a rear ventilation outlet, first air outlet channel 18 being able to be a rear ventilation outlet channel, and second air outlet 14 may be a rear footwell outlet, second air outlet channel 19 being able to be a rear footwell air outlet channel. Alternatively, other air outlets may also form the first or the second air outlet, for example a front defrosting outlet, a front ventilation outlet or a front footwell outlet. They may be coupled with each other, or two thereof or one of the air outlets of this type may also be coupled with one of the aforementioned rear air outlets.

Figure 2:
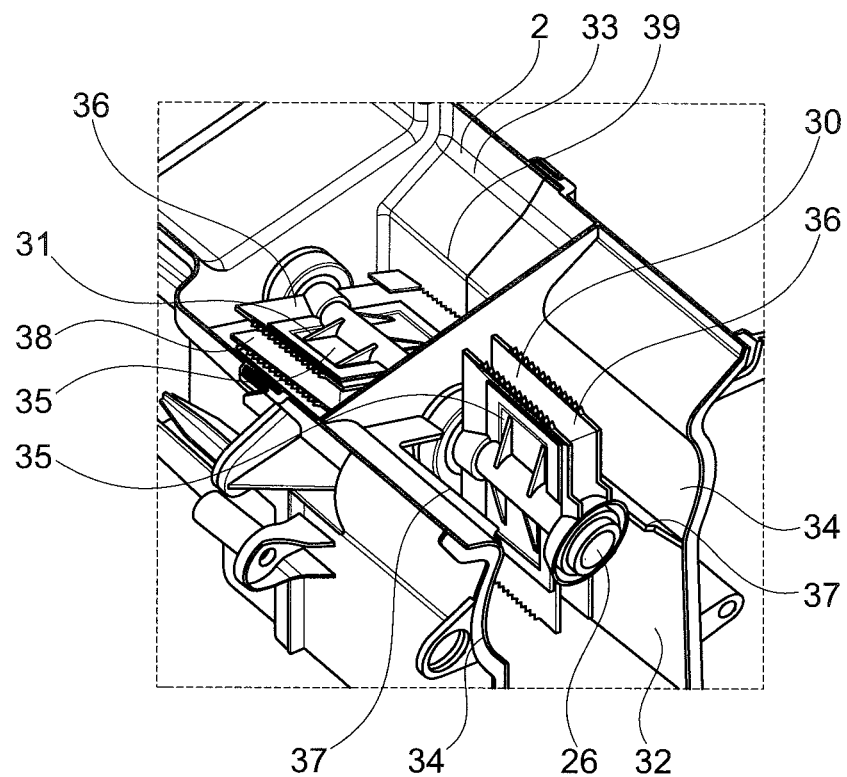
FIG. 2 shows a perspective partial representation of two air outlet channels of the motor vehicle air conditioning unit in a first operating state.
Figure 3:
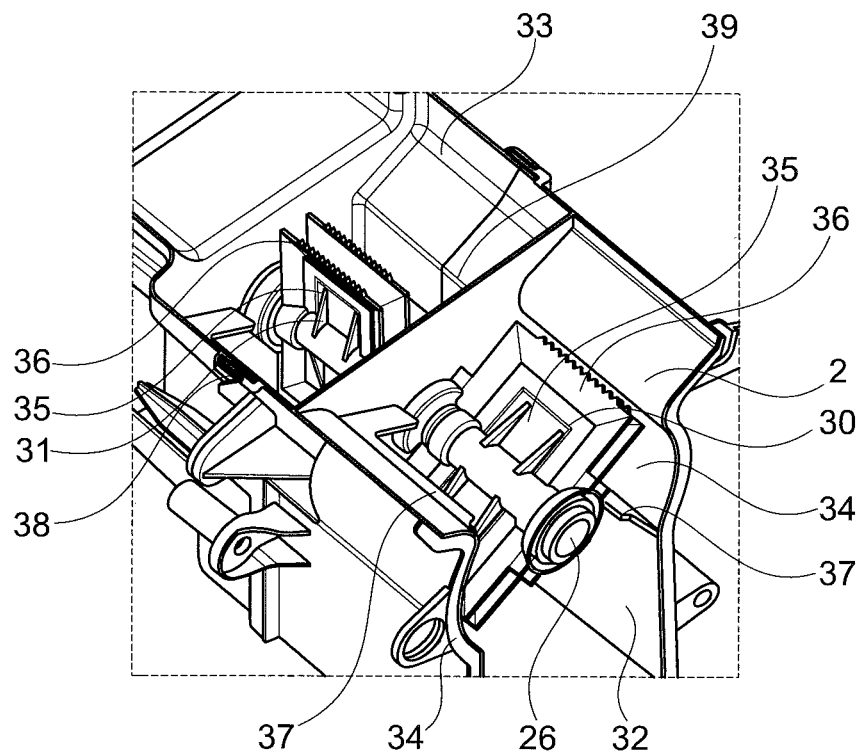
FIG. 3 shows a perspective partial representation of two air outlet channels of the motor vehicle air conditioning unit in a second operating state.
Figure 4:
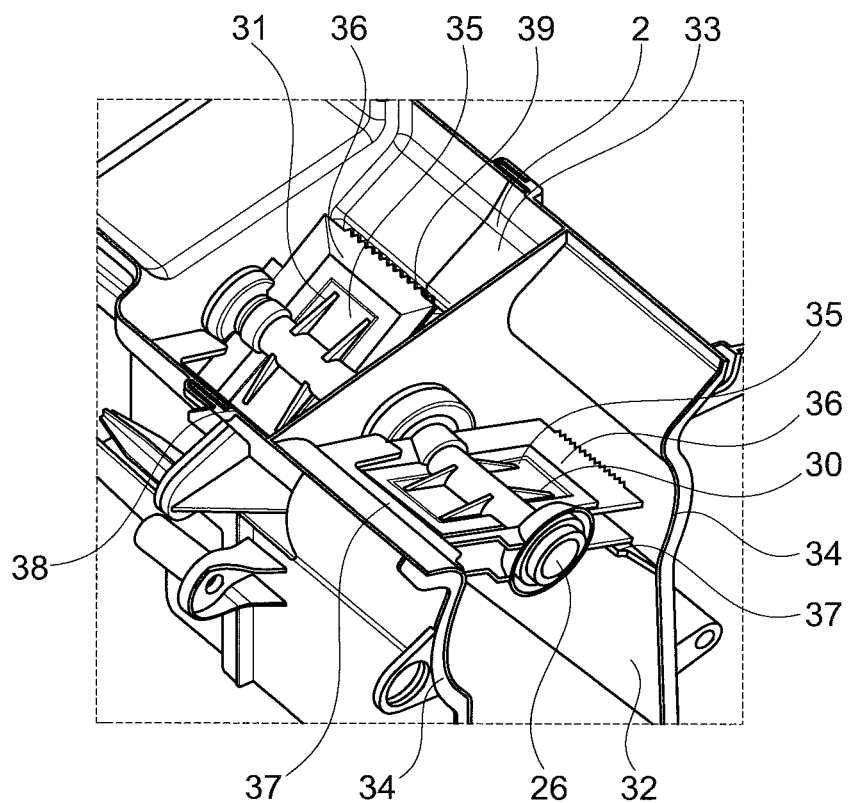
FIG. 4 shows a perspective partial representation of two air outlet channels of the motor vehicle air conditioning unit in a third operating state.

For the purpose of explaining the invention, FIGS. 2 through 4 each show two vane valves 30, 31 as first vane valve 30 and as second vane valve 31, which are arranged in a particular air outlet channel 32, 33, a first air outlet channel 32 and a second air outlet channel 33. FIGS. 2 through 4 each show a different operating state.

In the illustrated exemplary embodiment, first vane valve 30 is rotatable between a first end position and a second end position in first air outlet channel 32, the first end position being a fully open position (cf. FIG. 2), and the second end position being a fully closed position (cf. FIG. 4). FIG. 2 shows vane valve 30 in the first end position, i.e. in a fully open position. FIG. 4 also shows vane valve 30 in the second end position, i.e. in a fully closed position.

First air outlet channel 32 furthermore has a domed wall area 34 between the first end position and the second end position of first vane valve 30, which is selected in such a way that first vane valve 30 does not touch wall area 34 in a sealing manner with its vanes 35 and/or with sealing elements 36 provided on vanes 35. It is thus achieved that a limited through-flow of first air outlet channel 32 occurs in a position between the first end area and the second end area, because no seal is present (cf. FIG. 3).

It is furthermore apparent that first air outlet channel 32 has a stop 37 in the second end position, against which vane(s) 35 and/or sealing elements 36 provided on vanes 35 rest in a sealing manner in the second end position. It is thus achieved that first air outlet channel 32 is closed in the second end position (cf. FIG. 4).

It is also apparent in FIGS. 2 through 4 that second vane valve 31 is rotatable between a first end position and a second end position in second air outlet channel 33, the first end position being a fully closed position (cf. FIG. 2), and the second end position also being a fully closed position (cf. FIG. 4), second vane valve 31 being able to assume a fully open third position between the first end position and the second end position of second vane valve 31 (cf. FIG. 3)

For this purpose, second air outlet channel 33 has a stop 38 in the first end position, against which vane(s) 35 and/or sealing elements 36 provided on vanes 35 rest in a sealing manner in the first end position (cf. FIG. 2). Second air outlet channel 33 also has a stop 39 in the second end position, against which vane(s) 35 and/or sealing elements 36 provided on vanes 35 rest in a sealing manner in the second end position (cf. FIG. 4). It is furthermore apparent in FIG. 3 that second vane valve 31 releases second air outlet channel 33 in the fully open third position between the first end position and the second end position of second vane valve 31. Second vane valve 31 is oriented in parallel to air outlet channel 33.

it is also apparent from FIGS. 2 through 4 that first air outlet channel 32 and the second air outlet channel 33 are arranged in parallel to each other, at least in sections, and are arranged adjacent to each other.

It is also apparent in FIGS. 2 through 4 that shaft 26 intersects first air outlet channel 32 and second air outlet channel 33.

In the exemplary embodiment in FIGS. 2 through 4, first vane valve 30 and/or second vane valve 31 is/are designed as a type of butterfly valve having two vanes opposite each other. Alternatively, the particular vane valve could also be designed as a type of lug vane having one vane.

Figure 5:
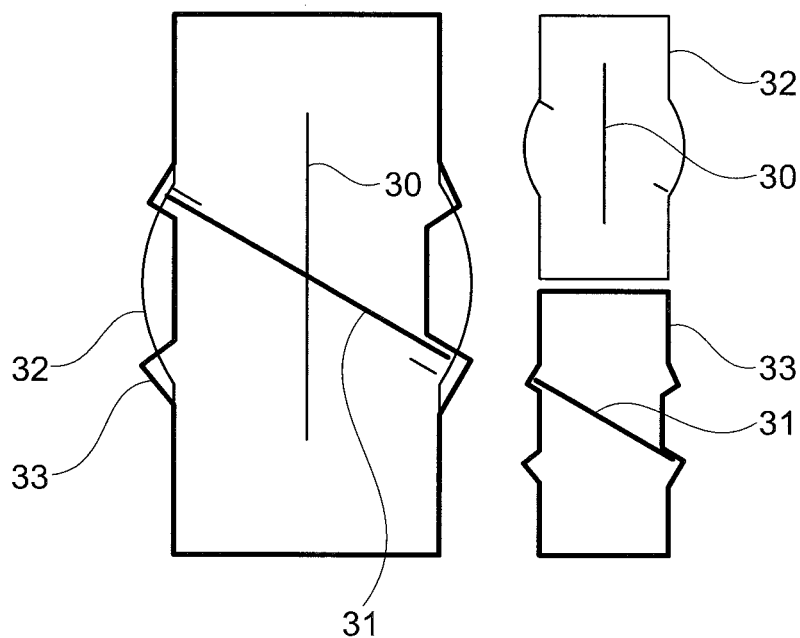
FIG. 5 shows a schematic representation of the two air outlet channels of the motor vehicle air conditioning unit in the first operating state.
Figure 6:
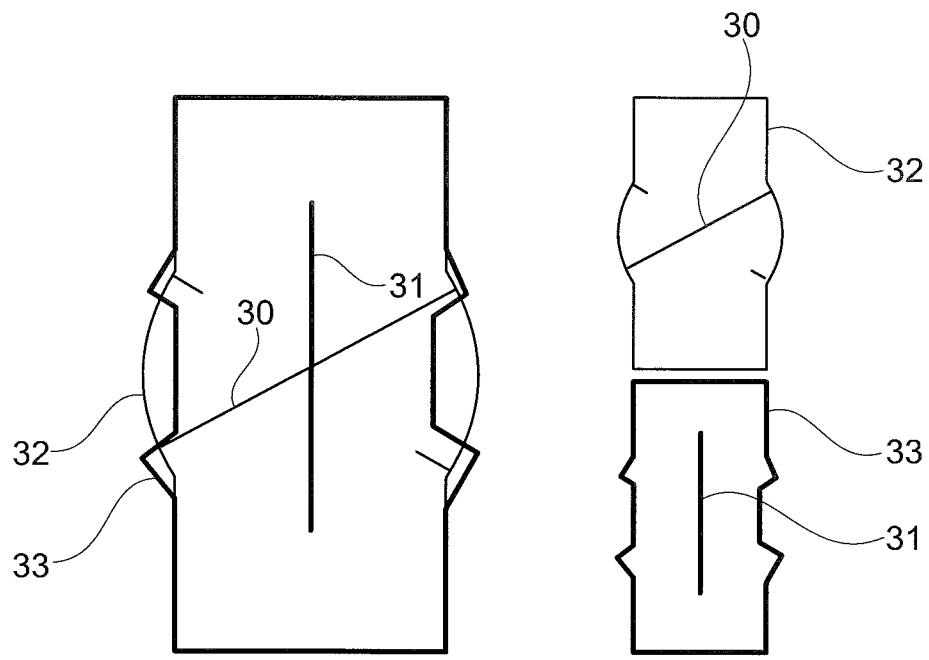
FIG. 6 shows a schematic representation of the two air outlet channels of the motor vehicle air conditioning unit in the second operating state.
Figure 7:
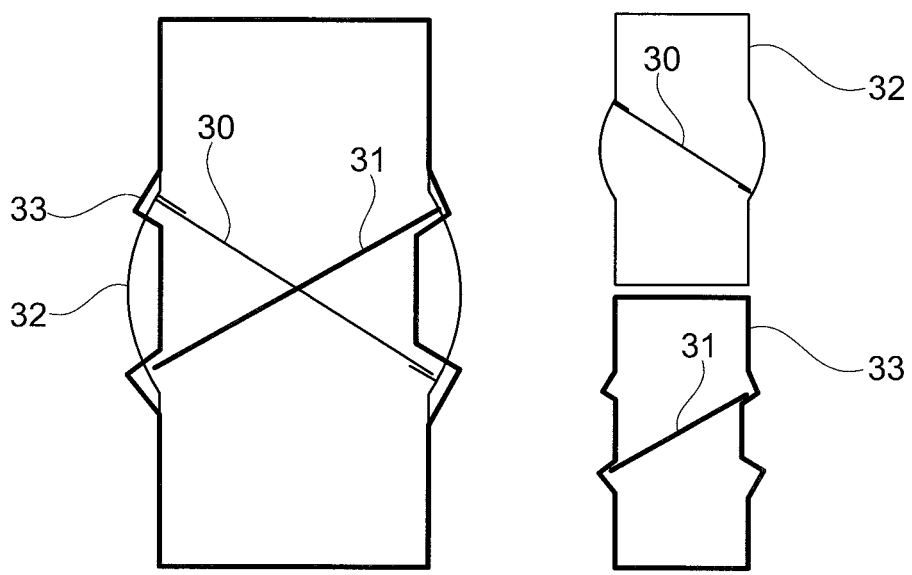
FIG. 7 shows a schematic representation of the two air outlet channels of the motor vehicle air conditioning unit in the third operating state.

FIGS. 5 through 7 show the subject matter of FIGS. 2 through 4 once again in a schematic representation. The three FIGS. 5 through 7 each show a drawing on the left with a combined representation of both air outlet channels 32, 33, including both vane valves 30, 31, the upper right drawing illustrating first air outlet channel 32, including first vane valve 30, and the lower right drawing illustrating second air outlet channel 33, including second vane valve 31.

First vane valve 30 may be pivoted from the first open end position in FIG. 5 via the position in FIG. 6 to the second end position in FIG. 7.

Second vane valve 31 may be pivoted from the first closed end position in FIG. 5 via the open position in FIG. 6 to the second closed end position in FIG. 7.

The pivot angle of first vane valve 30 and second vane valve 31 is approximately 120°, the two valves being arranged, rotated relative to each other, for example, by 60°.

The present invention thus permits multiple vane valves of air outlets or of air outlet channels to be combined on a shared shaft, the following operating states being possible as examples:
1.) Rear footwell outlet 0% open, rear ventilation outlet with leakage
2.) Rear footwell outlet 50% open, rear ventilation outlet with leakage
3.) Rear footwell outlet 100% open, rear ventilation outlet with leakage
4.) Rear footwell outlet 50% open, rear ventilation outlet 50% open
5.) Rear footwell outlet 0% open, rear ventilation outlet 100% open The particular opening ratio is determined, for example, by the structure of the covering contours of the particular air outlet channel.

The combination of multiple vane valves on one shaft and the corresponding arrangement of covering contours of the corresponding air outlet channel yield many different possible combinations of opening states.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor vehicle air conditioning unit comprising:
   a housing having at least one first air outlet and one second air outlet, a first air outlet channel being assigned to the first air outlet and conducting air to the first air outlet, and a second air outlet channel being assigned to the second air outlet and conducting air to the second air outlet;
   at least one air channel arranged in the housing, the at least one air channel being arranged upstream of the first air outlet channel and the second air outlet channel with respect to an air flow direction;
   at least one heat exchanger arranged in the housing for conditioning the air in the at least one air channel; and
   a first vane valve and a second vane valve, the first vane valve being assigned to the first air outlet channel, and the second vane valve being assigned to the second air outlet channel, the first vane valve and the second vane valve being rotatably fixedly connected to a shaft and being rotatable by an actuator driving the shaft,
   wherein the second vane valve is rotatable between a first end position and a second end position in the second air outlet channel, the first end position being a fully closed position, and the second end position being a fully closed position, the second vane valve being able to assume a fully open third position between the first end position and the second end position of the second vane valve.

2. The motor vehicle air conditioning unit according to claim 1, wherein the first air outlet is a rear footwell outlet, the first air outlet channel is a rear footwell air outlet channel, and the second air out is a rear ventilation outlet, the second air outlet channel is a rear ventilation air outlet channel, or the first air outlet is a rear ventilation outlet, the first air outlet channel is a rear ventilation outlet channel, and the second air outlet is a rear footwell outlet, the second air outlet channel is a rear footwell air outlet channel.

3. The motor vehicle air conditioning unit according to claim 1, wherein the first vane valve is rotatable between a first end position and a second end position in the first air outlet channel, and wherein the first end position being a fully open position, and the second end position being a fully closed position.

4. The motor vehicle air conditioning unit according to claim 1, wherein the second air outlet channel has a stop in the first end position, against which at least one of vanes or sealing elements provided on the vanes of the second vane valve rest in a sealing manner in the first end position, and the second air outlet channel has a stop in the second end position, against which the at least one of the vanes or the sealing elements provided on the vanes of the second vane valve rest in a sealing manner in the second end position, the second vane valve releasing the second air outlet channel in the open third position between the first end position and the second end position of the second vane valve.

5. The motor vehicle air conditioning unit according to claim 1, wherein the first air outlet channel and the second air outlet channel are arranged in parallel to each other and are arranged adjacent to each other.

6. The motor vehicle air conditioning unit according to claim 1, wherein the shaft intersects the first air outlet channel and the second air outlet channel.

7. The motor vehicle air conditioning unit according to claim 1, wherein the first vane valve and the second vane valve are a lug valve with one vane or a butterfly valve with two vanes opposite each other.

8. The motor vehicle air conditioning unit according to claim 1, wherein the second air outlet channel has a stop in the first end position, against which the second vane valve rests in a sealing manner in the first end position, and the second air outlet channel has a stop in the second end position, against which the second vane valve rests in a sealing manner in the second end position, the second vane valve releasing the second air outlet channel in the open third position between the first end position and the second end position of the second vane valve.

9. A motor vehicle air conditioning unit comprising:
a housing having at least one first air outlet and one second air outlet, a first air outlet channel being assigned to the first air outlet and conducting air to the first air outlet, and a second air outlet channel being assigned to the second air outlet and conducting air to the second air outlet;
at least one air channel arranged in the housing, the at least one air channel being arranged upstream of the first air outlet channel and the second air outlet channel with respect to an air flow direction;
at least one heat exchanger arranged in the housing for conditioning the air in the at least one air channel; and
a first vane valve and a second vane valve, the first vane valve being assigned to the first air outlet channel, and the second vane valve being assigned to the second air outlet channel, the first vane valve and the second vane valve being rotatably fixedly connected to a shaft and being rotatable by an actuator driving the shaft,
wherein the first vane valve is rotatable between a first end position and a second end position in the first air outlet channel, the first end position being a fully open position and the second end position being a fully closed position, and
wherein the first air outlet channel has a domed wall area between the first end position and the second end position of the first vane valve, which is selected such that the first vane valve does not touch the wall area in a sealing manner with at least one of vanes of the first vane valve or sealing elements provided on the vanes.

10. The motor vehicle air conditioning unit according to claim 9, wherein the first air outlet channel has a stop in the second end position, against which at least one of the vanes or the sealing elements provided on the vanes of the first vane valve rest in a sealing manner in the second end position.

11. A motor vehicle air conditioning unit comprising:
a housing having at least one first air outlet and one second air outlet, a first air outlet channel being assigned to the first air outlet and conducting air to the first air outlet, and a second air outlet channel being assigned to the second air outlet and conducting air to the second air outlet;
at least one air channel arranged in the housing, the at least one air channel being arranged upstream of the first air outlet channel and the second air outlet channel with respect to an air flow direction;
at least one heat exchanger arranged in the housing for conditioning the air in the at least one air channel; and
a first vane valve and a second vane valve, the first vane valve being assigned to the first air outlet channel, and the second vane valve being assigned to the second air outlet channel, the first vane valve and the second vane valve being rotatably fixedly connected to a shaft and being rotatable by an actuator driving the shaft,
wherein the first vane valve is rotatable between a first end position and a second end position in the first air outlet channel, the first end position being a fully open position and the second end position being a fully closed position, and
wherein the first air outlet channel has a domed wall area between the first end position and the second end position of the first vane valve, which is selected such that the first vane valve does not touch the wall area in a sealing manner.

12. The motor vehicle air conditioning unit according to claim 11, wherein the first air outlet channel has a stop in the second end position, against which the first vane valve rests in a sealing manner in the second end position.

* * * * *